Patented Feb. 26, 1952

2,587,484

UNITED STATES PATENT OFFICE 2,587,484

INSECTICIDAL COMPOSITIONS COMPRISING A POLYCHLORO CHLOROMETHYL 2,5 ENDOMETHYLENE CYCLOHEXENE 3

Allen R. Kittleson, Cranford, and Anthony H. Gleason, Westfield, N. J., assignors to Standard Oil Development Company, a corporation of Delaware No Drawing. Application May 22, 1948, Serial No. 28,758

5 Claims. (Cl. 167—30)

This invention relates to new and useful improvements in insecticidal preparations. This invention also relates to methods of protecting organic material subject to attack by low orders of organisms.

It has now been found that polychlorinated compounds made from chloromethyl 2,5 endomethylene cyclohexene-3 and especially those compounds having from 50 to 75% chlorine based on the weight of the chlorinated product are extremely effective for killing and repelling insects.

These compounds are especially effective against destructive chewing insects such as the Mexican bean beetle, the Colorado potato beetle and caterpillars. Since the compositions of these inventions are non-phytotoxic, they may be applied directly to a wide variety of plants to protect them from injurious insects.

The preparation of chloromethyl 2,5 endomethylene cyclohexene-3

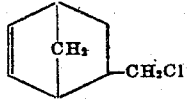

is known and is given in the literature (K. Alder and E. Windemuth; Ber. 71B, (1939) (1938)). One of the methods of preparing it is by the condensation of allyl chloride with mono or dicyclopentadiene.

The chlorinated products are then prepared by the chlorination of the chloromethyl 2,5 endomethylene cyclohexene-3. The polychlorinated compounds of chloromethyl 2,5 endomethylene cyclohexene-3 are straw colored viscous oils soluble in acetone, petroleum ether, benzene, carbon tetrachloride and other organic solvents.

Chloromethyl 2,5 endomethylene cyclohexene-3 may be chlorinated in the presence or absence of a solvent. Suitable solvents for the chlorination are chloroform, carbon tetrachloride, etc. The initial stages of the chlorination may be carried out at room temperature or lower. To attain a more rapid rate of reaction at the higher chlorine content levels, elevated temperatures are desirable. A chlorination catalyst may be used, if desired. Ultraviolet light is particularly efficient. A chlorine content of from 50 to 75% chlorine based on weight of the chlorinated product has been found to give the greatest insecticidal activity. This activity diminishes as the chlorine content becomes less than 50% or more than 75%.

The compounds of this invention may be adsorbed on a solid carrier such as clay, talc and bentonite to be applied as a diluted dust. They may also be applied as a spray in a liquid carrier either as a solution in a solvent or as a suspension in a non-solvent such as water. When applied as a spray in water, it may be desirable to incorporate a wetting agent.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide condensation products of alkylated phenols may also be used. It is to be understood that these and similar compounds are intended when the term wetting agent is used hereafter.

The compounds of this invention may also be admixed with carriers that are themselves active such as parasiticides, hormones, herbicides, fertilizers and wetting agents, stomach and contact insecticides such as the arsenates, fluorides, rotenone and the various fish poisons and organic insecticides such as dichlorodiphenyl trichloroethane. Benzene-hexachloride and similar products may also be advantageously added.

This invention will be better understood by reference to the following examples of the preparation of the compounds of this invention and their use for the stated purpose.

EXAMPLE I

Chloromethyl 2,5 endomethylene cyclohexene-3 (71 g.) was charged to a 500 cc. 3-necked quartz flask equipped with a stirrer, thermometer, reflux condenser and inlet tube for chlorine.

Chlorine was bubbled into the rapidly stirred liquid starting at room temperature. The temperature rapidly increased to 80° C. due to heat of reaction. During the first two hours of reaction the temperature was maintained at 70–80° C. by occasional cooling. The rate of chlorine absorption then decreased and the temperature dropped to 50° C. The chlorination was continued at 80–95° C., using ultraviolet light to catalyze the reaction. Samples A, B and C were removed after chlorinating for 9, 15 and 22 hours respectively. The chlorine content of the samples was A=67.9% Cl; B=70.0% Cl and C=72.5% Cl.

EXAMPLE II

The insecticidal activity of the products obtained by the above procedure is given in the table below.

The values given under contact insecticidal activity represent the mortality of the test insect after 96 hours following a 2 minute immersion in a 0.25 aqueous suspension or dispersion of the test compound.

Results of the bloodstream insecticidal activity are given as per cent mortality after 96 hours following bloodstream injection of 0.5 mg. of the test compound per gram of insect body weight.

The housefly toxicity (Nelson Drop Test) gives the per cent mortality after 24 hours following application of 0.002 cc. of the specified concentration of the test material (in acetone) on the fly's body.

Table

| Samples of Chlorinated Chloromethyl 2,5 Endomethylene Cyclohexene-3 | Contact Insecticidal Activity (Per Cent Kill) | | Bloodstream Insecticidal Activity (Per Cent Kill) | | Housefly Toxicity Nelson Drop Test | |
|---|---|---|---|---|---|---|
| | Blatella germanica (German Roach) | Omelpeltus sociatus (Milkweed Bug) | Periplanitus americana (American Roach) | | Conc. of Test Cpd. | Per Cent Kill |
| | | | Male | Female | | |
| A | 100 | 100 | 100 | 100 | | |
| B | 100 | 100 | 100 | 100 | .025 / .0125 | 100 / 75 |
| C | 100 | 100 | 100 | 100 | .025 / .0125 | 95 / 75 |
| Control (Pyrethrins) | | | | | .04 | 40 |

It should be noted that the compounds of this invention were much more effective than pyrethrins in fly toxicity.

It is to be understood that the invention is not limited to the specific examples which have been offered merely as illustration and that modification may be made within the scope of the appended claims without departing from the spirit of the invention.

What is claimed is:

1. An insecticidal composition comprising as an active ingredient a polychloro chloromethyl 2,5 endomethylene cyclohexene-3 containing from 50 to 75% by weight of chlorine admixed with an emulsifying agent which lowers the surface tension of water and thereby promotes aqueous emulsions of the active ingredient, said active ingredient being prepared by a process which comprises treating chloromethyl 2,5 endomethylene cyclohexene-3 with chlorine at a temperature between about 20 and 100° C. in the presence of ultraviolet light.

2. A composition as in claim 1 in which the emulsifying agent is selected from the group consisting of long chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

3. An insecticidal composition comprising as an active ingredient a polychloro chloromethyl 2,5 endomethylene cyclohexene-3 containing from 50 to 75% by weight of chlorine admixed with an inert, finely divided, solid diluent, said active ingredient being prepared by a process which comprises treating chloromethyl 2,5 endomethylene cyclohexene-3 with chlorine at a temperature between about 20 and 100° C. in the presence of ultraviolet light.

4. An insecticidal composition comprising as an active ingredient a polychloro chloromethyl 2,5 endomethylene cyclohexene-3 containing from 50 to 75% by weight of chlorine admixed with a powdered clay, said active ingredient being prepared by a process which comprises treating chloromethyl 2,5 endomethylene cyclohexene-3 with chlorine at a temperature between about 20 and 100° C. in the presence of ultraviolet light.

5. An insecticidal composition as in claim 4 in which the clay is bentonite.

ALLEN R. KITTLESON.
ANTHONY H. GLEASON.

REFERENCES CITED

The following references are of record in the file of this patent:

UNITED STATES PATENTS

| Number | Name | Date |
|---|---|---|
| 2,010,841 | Bender | Aug. 13, 1935 |
| 2,121,330 | Scherer et al. | June 21, 1938 |
| 2,336,208 | Alder et al. | Dec. 7, 1943 |
| 2,352,606 | Alder et al. | July 4, 1944 |
| 2,382,038 | Bruson | Aug. 14, 1945 |
| 2,415,453 | Thomas | Feb. 11, 1947 |
| 2,427,345 | Bain | Sept. 16, 1947 |
| 2,459,544 | Schmerling | Jan. 18, 1949 |

OTHER REFERENCES

Parker et al.: "Bulletin No. 264, Tech. No. 36, University of Delaware Agr. Expt. Stat.," February 1947.

Desalbres et al.: Chimie et Industrie, vol. 58, pp. 443–448 (1947).